US012749250B2

(12) United States Patent
Guay et al.

(10) Patent No.: US 12,749,250 B2
(45) Date of Patent: Sep. 29, 2026

(54) POSE-AWARE NEURAL INVERSE KINEMATICS

(71) Applicants: DISNEY ENTERPRISES, INC., Burbank, CA (US); ETH Zürich (Eidgenössische Technische Hochschule Zürich), Zürich (CH)

(72) Inventors: Martin Guay, Unterengstringen (CH); Dhruv Agrawal, Zürich (CH); Dominik Tobias Borer, Dübendorf (CH); Jakob Joachim Buhmann, Zürich (CH); Robert Walker Sumner, Zürich (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 81 days.

(21) Appl. No.: 18/769,012

(22) Filed: Jul. 10, 2024

(65) Prior Publication Data

US 2025/0022202 A1 Jan. 16, 2025

Related U.S. Application Data

(60) Provisional application No. 63/513,724, filed on Jul. 14, 2023.

(51) Int. Cl.
*G06T 13/40* (2011.01)
*G06F 17/16* (2006.01)
(Continued)

(52) U.S. Cl.
CPC .............. *G06T 13/40* (2013.01); *G06F 17/16* (2013.01); *G06N 3/0455* (2023.01); *G06N 3/0475* (2023.01); *G06N 3/09* (2023.01)

(58) Field of Classification Search
CPC ...................................................... G06T 13/40
See application file for complete search history.

(56) References Cited

U.S. PATENT DOCUMENTS

| | | | | |
|---|---|---|---|---|
| 11,694,382 | B2 | 7/2023 | Bocquelet et al. | |
| 2021/0232924 | A1* | 7/2021 | Sun | G06V 10/809 |
| 2024/0054671 | A1* | 2/2024 | Oreshkin | G06V 10/44 |

OTHER PUBLICATIONS

Aberman et al., "Skeleton-Aware Networks for Deep Motion Retargeting", ACM Transactions on Graphics, https://doi.org/10.1145/3386569.3392462, vol. 39, No. 4, Article 62, Jul. 2020, pp. 62:1-62:14.

(Continued)

*Primary Examiner* — Shivang I Patel
(74) *Attorney, Agent, or Firm* — Squire Patton Boggs LLP; Sarah Mirza

(57) ABSTRACT

One embodiment of the present invention sets forth a technique for generating a pose for a virtual character. The technique includes determining a set of joint representations corresponding to a set of joints in the virtual character based on (i) a base pose for the virtual character and (ii) a set of constraints associated with one or more joints included in the set of joints. The technique also includes generating, via execution of a first neural network, a set of updated joint states for the set of joints based on the set of joint representations. The technique further includes generating, based on the set of updated joint states, an output pose that includes (i) a first set of joint positions for the set of joints and (ii) a first set of joint orientations for the set of joints.

20 Claims, 5 Drawing Sheets

(51) Int. Cl.
*G06N 3/0455* (2023.01)
*G06N 3/0475* (2023.01)
*G06N 3/09* (2023.01)

(56) References Cited

OTHER PUBLICATIONS

Balestrino et al., "Robust Control of Robotic Manipulators", 1984, pp. 2435-2440.
Bruna et al., "Spectral Networks and Deep Locally Connected Networks on Graphs", arXiv:1312.6203, Feb. 20, 2014, pp. 1-14.
Buss et al., "Selectively Damped Least Squares for Inverse Kinematics", Journal of Graphics tools, vol. 10, No. 3, Oct. 25, 2004, pp. 1-13.
Castillo et al., "BoDiffusion: Diffusing Sparse Observations for Full-Body Human Motion Synthesis", 2023, pp. 4221-4231.
Csiszar et al., "On Solving the Inverse Kinematics Problem using Neural Networks", Mechatronics and Machine Vision in Practice, Nov. 21-23, 2017, pp. 386-391.
D'Souza et al., "Learning Inverse Kinematics", International Conference on Intelligence in Robotics and Autonomous Systems, 2001, 8 pages.
Dwivedi et al., "A Generalization of Transformer Networks to Graphs", arXiv:2012.09699, Jan. 24, 2021, 8 pages.
Gilmer et al., "Neural Message Passing for Quantum Chemistry", Proceedings of the 34 th International Conference on Machine Learning, 2017, 10 pages.
Girard et al., "Computational Modeling for the Computer Animation of Legged Figures", vol. 19, No. 3, Jul. 22-26, 1985, pp. 263-270.
Grigorev et al., "HOOD: Hierarchical Graphs for Generalized Modelling of Clothing Dynamics", Computer Vision and Pattern Recognition, 2021, pp. 16965-16974.
Huang et al., "Deep Inertial Poser: Learning to Reconstruct Human Pose from Sparse Inertial Measurements in Real Time", ACM Transactions on Graphics, https://doi.org/10.1145/3272127.3275108, vol. 37, No. 6, Article 185, Nov. 2018, pp. 185:1-185:15.
Jiang et al., "Transformer Inertial Poser: Real-time Human Motion Reconstruction from Sparse IMUs with Simultaneous Terrain Generation", https://doi.org/10.1145/3550469.3555428, Dec. 6-9, 2022, 12 pages.
Li et al., "Task-Generic Hierarchical Human Motion Prior using VAEs", arXiv:2106.04004, Jun. 7, 2021, 11 pages.
Loper et al., "SMPL: A Skinned Multi-Person Linear Model", ACM Transactions on Graphics, DOI: http://doi.acm.org/10.1145/2816795.2818013, vol. 34, No. 6, Article 248, Nov. 2015, pp. 248:1-248:16.
Oreshkin et al., "Protores: Proto-Residual Network for Pose Authoring Via Learned Inverse Kinematics", arXiv:2106.01981, Aug. 16, 2022, pp. 1-33.
Pfaff et al., "Learning Mesh-Based Simulation with Graph Networks", arXiv:2010.03409, Jun. 18, 2021, pp. 1-18.
Ren et al., "Learning Inverse Kinematics and Dynamics Of A Robotic Manipulator Using Generative Adversarial Networks", Robotics and Autonomous Systems, vol. 124, https://doi.org/10.1016/j.robot.2019.103386, Nov. 22, 2019, pp. 1-12.
Vaswani et al., "Attention Is All You Need", 31st Conference on Neural Information Processing Systems, 2017, pp. 1-11.
Velickovic et al., "Graph Attention Networks", International Conference on Learning Representations, 2018, 12 pages.
Voleti et al., "SMPL-IK: Learned Morphology-Aware Inverse Kinematics for AI Driven Artistic Workflows", SIGGRAPH Asia arXiv:2208.08274, Dec. 6-9, 2022, 7 pages.
Wang et al., "Graph Multihead Attention Pooling with Self-Supervised Learning", Entropy 24, vol. 12, https://doi.org/10.3390/e24121745, Nov. 29, 2022, 16 pages.
Yamane et al., "Natural Motion Animation through Constraining and Deconstraining at Will", IEEE Transactions on Visualization And Computer Graphics, vol. 9, No. 3, Jul.-Sep. 2003, pp. 352-360.
Yi et al., "Physical Inertial Poser (PIP): Physics-aware Real-time Human Motion Tracking from Sparse Inertial Sensors", IEEE/CVF Conference on Computer Vision and Pattern Recognition, 2022, pp. 13167-13178.
Extended European Search Report for Application No. 24188403.0 dated Nov. 19, 2024.
Sun et al., "Monocular, One-stage, Regression of Multiple 3D People", arXiv:2008.12272, Apr. 2, 2021, 10 pages.
Li et al., "Dynamic Multiscale Graph Neural Networks for 3D Skeleton-Based Human Motion Prediction", IEEE/CVF Conference on Computer Vision And Pattern Recognition, DOI: 10.1109/CVPR42600.2020.00029, Jun. 13, 2020, pp. 214-223.
First Examination Report received for Australian Application No. 2024204836 dated Aug. 21, 2025, 3 pages.
Second Examination Report received for Australian Application No. 2024204836 dated Aug. 28, 2025, 3 pages.
Office Action Received For Canadian Application No. 3,248,395 dated Oct. 3, 2025, 4 Pages.
Third Examination Report received for Australian Application No. 2024204836 dated Mar. 10, 2026, 4 pages.

* cited by examiner

POSE-AWARE NEURAL INVERSE KINEMATICS

CROSS-REFERENCE TO RELATED APPLICATIONS

This application claims the benefit of the U.S. Provisional Application titled "Pose-Aware Neural Inverse Kinematics for Efficient Pose and Motion Editing," filed on Jul. 14, 2023, and having Ser. No. 63/513,724. The subject matter of this application is hereby incorporated herein by reference in its entirety.

BACKGROUND

Field of the Various Embodiments

Embodiments of the present disclosure relate generally to computer vision and machine learning and, more specifically, to pose-aware neural inverse kinematics.

Description of the Related Art

Films, video games, virtual reality (VR) systems, augmented reality (AR) systems, mixed reality (MR) systems, robotics, and/or other types of interactive environments frequently include entities (e.g., characters, robots, etc.) that are posed and/or animated in three-dimensional (3D) space. Traditional techniques for posing an entity involve manually manipulating multiple control handles corresponding to joints (or other parts) of the entity. An inverse kinematics (IK) technique can also be used to compute the positions and orientations of remaining joints (or parts) of the entity that result in the desired configuration of the manipulated joints (or parts).

However, posing and/or animating entities using conventional IK techniques is associated with a number of drawbacks. First, posing an entity via manipulation of control handles is a time-consuming, iterative, and laborious process. This manual process is repeated for a sequence of poses corresponding to movements that are used to animate the entity, which incurs additional time and resource overhead. Second, poses generated via traditional IK techniques can be unnatural or unrealistic.

Recent advancements in machine learning and deep learning have led to the development of neural IK models, which include neural networks that leverage full-body correlations learned from large datasets to compute the positions and orientations of un-manipulated joints of the body based on manipulated handles and/or other sparse control inputs. However, current neural IK models generate a "global" pose from the sparse control inputs, which can cause a pose outputted by a neural IK model to be influenced by the sparse control inputs. For example, a change in sparse control inputs that corresponds to movement in one hand of a virtual character may cause the neural IK model to generate a new pose that "wiggles" the other hand.

The global nature of conventional neural IK predictions further precludes the preservation of previous edits in posing workflows. For example, an artist may use a neural IK model to generate additional poses for a character from a base pose that was initially defined using a tool that uses conventional IK. As the artist manipulates the joints of the character, the neural IK model may change other joints in the character based on the manipulations and "destroy" portions of the base pose that were previously defined using the other tool.

As the foregoing illustrates, what is needed in the art are more effective techniques for performing neural IK.

SUMMARY

One embodiment of the present invention sets forth a technique for generating a pose for a virtual character. The technique includes determining a set of joint representations corresponding to a set of joints in the virtual character based on (i) a base pose for the virtual character and (ii) a set of constraints associated with one or more joints included in the set of joints. The technique also includes generating, via execution of a first neural network, a set of updated joint states for the set of joints based on the set of joint representations. The technique further includes generating, based on the set of updated joint states, an output pose that includes (i) a first set of joint positions for the set of joints and (ii) a first set of joint orientations for the set of joints.

One technical advantage of the disclosed techniques relative to the prior art is the ability to generate new poses that satisfy sparse constraints while selectively preserving certain aspects of a base pose. The disclosed techniques thus avoid issues associated with global pose changes in conventional neural IK models, where manipulating one part of a skeletal structure can result in changes to un-manipulated parts of the skeletal structure. Another technical advantage of the disclosed techniques is the preservation of previous edits in computer-based posing workflows. Consequently, the disclosed techniques allow artists and/or other users to iteratively refine poses without losing previous work, which can reduce latency and/or improve efficiency associated with the use of computer-based posing workflows to pose and/or animate virtual characters. An additional technical advantage of the disclosed techniques is the ability to learn both local and global representations of a pose via the use of a graph neural network with a cross-layer attention mechanism that performs message passing across multiple resolutions associated with the skeletal structure. As a result, output poses generated via the disclosed techniques can be more natural and realistic than poses produced using traditional IK techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
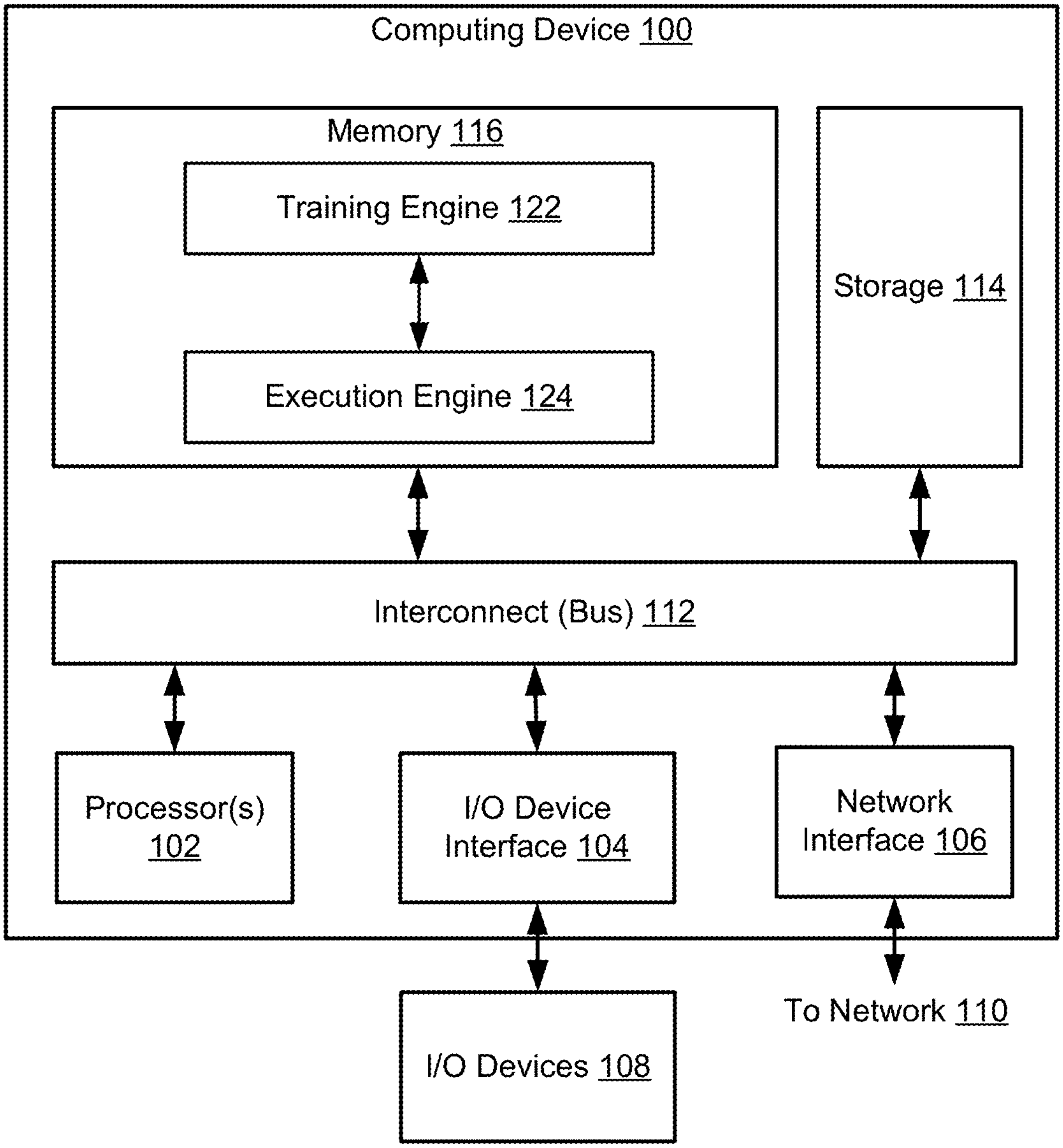
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 and execution engine 124 operate to train and execute a machine learning model to perform pose-aware neural inverse kinematics (IK). More specifically, training engine 122 trains the machine learning model using a pose preservation loss that is computed using an output pose generated by the machine learning model, a corresponding base pose inputted into the machine learning model, and/or input control parameters that specify the degree to which positions, orientations, and/or other aspects of the base pose are to be preserved. Execution engine 124 executes the trained machine learning model to generate new poses that satisfy sparse constraints (e.g., positions and/or orientations of a subset of joints) while selectively preserving certain aspects of an inputted base pose. Training engine 122 and execution engine 124 are described in further detail below.

Pose-Aware Neural Inverse Kinematics

Figure 2:
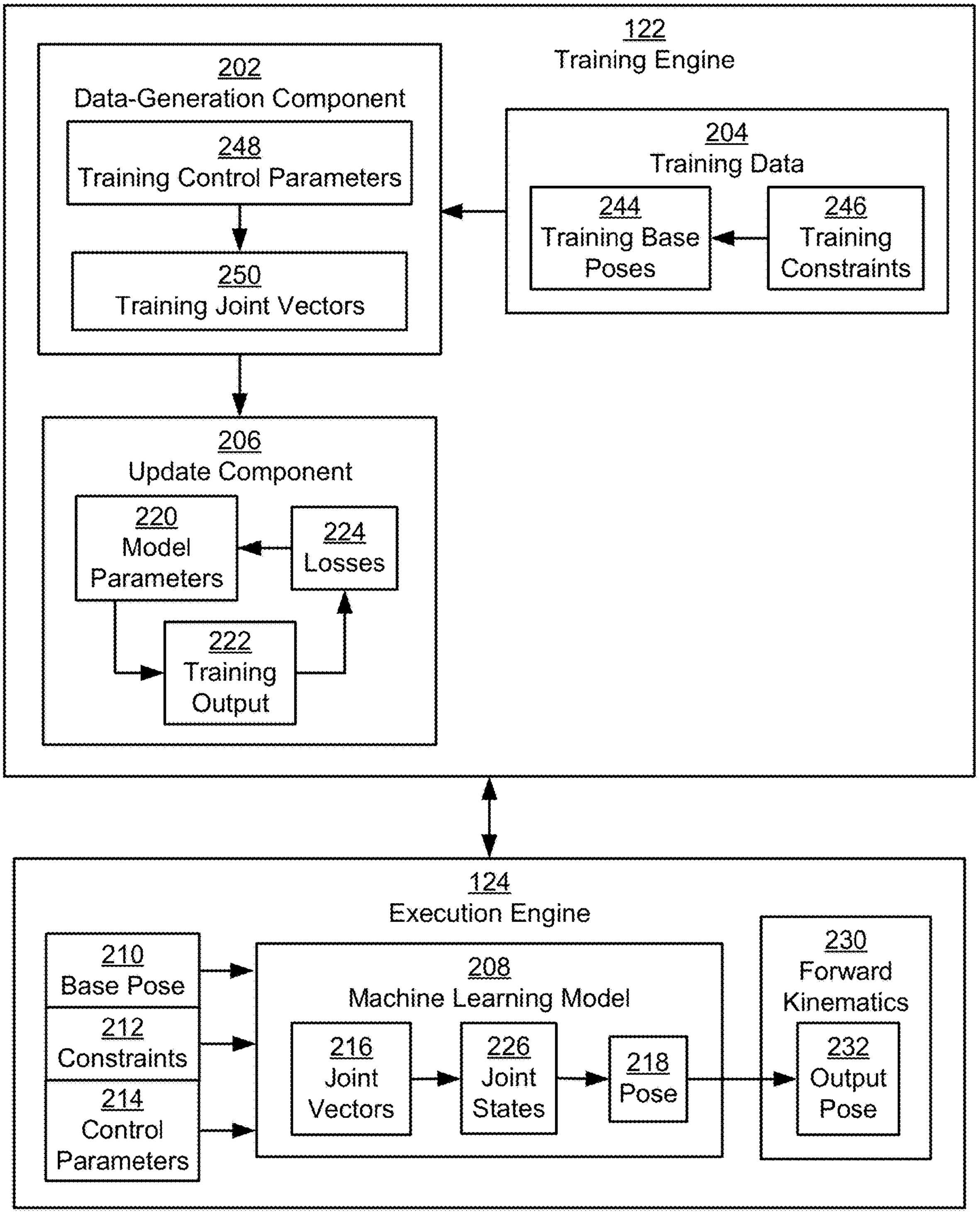
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a machine learning model 208 to perform neural IK for a virtual character. For example, training engine 122 and execution engine 124 may use machine learning model 208 to generate an output pose 222 for a human, animal, robot, and/or another type of articulated object corresponding to the virtual character. This output poses 222 may include a set of two-dimensional (2D) and/or three-dimensional (3D) joint positions, joint rotations, and/or other representations of joints in the articulated object.

As shown in FIG. 2, input into machine leaning model 208 includes a base pose 210, a set of constraints 212, and a set of control parameters 214. Base pose 210 includes "default" positions, orientations, and/or other attributes of some or all joints in the virtual character. For example, base pose 210 may include a previously defined pose for the virtual character, as specified by an artist, a posing tool, a neural IK model, a motion capture dataset, and/or a frame in an animation that includes the virtual character.

Constraints 212 include changes to and/or deviations from base pose 210 for one or more joints of the virtual character. For example, constraints 212 may include positions, orientations, look-at constraints, and/or other types of attributes that are specified via user manipulation of control handles for the joint(s) of the virtual character and/or other user-interface elements.

Control parameters 214 include values that are used to control the generation of output pose 222 from base pose 210 and constraints 212. For example, control parameters 214 may include an orientation preservation parameter in the range of [0,1] that specifies the extent to which the orientations of joints in base pose 210 should be preserved. Control parameters 214 may also, or instead, include a position preservation parameter in the range of [0,1] that specifies the extent to which the positions of joints in base pose 210 should be preserved. Values of the orientation preservation parameter and position preservation parameter may be specified for individual joints, sets of joints (e.g., limbs, body segments, upper body, lower body, etc.), all joints in the virtual character, and/or other groupings of one or more joints in the virtual character.

Given base pose 210, constraints 212, and control parameters 214, machine learning model 208 generates a new pose 218 that includes updated positions, orientations, and/or other attributes of some or all joints in the virtual character. Pose 218 can include attributes of joints that are derived from base pose 210 and/or constraints 212, where the influence of base pose 210 and/or constraints 212 on one or more attributes of a given joint is determined based on one or more corresponding control parameters 214. Continuing with the above example, a higher value for the orientation preservation parameter may cause the orientations of a corresponding grouping of joints in base pose 210 to exert a greater influence on the orientations of the same joints within the new pose 218. Similarly, a higher value for the position preservation parameter may cause the positions of a corresponding grouping of joints in base pose 210 to exert a greater influence on the positions of the same joints within the new pose 218. In both instances, a greater influence of base pose 210 on the new pose 218 may cause one or more joints in the new pose 218 to deviate from the corresponding constraints 212. Conversely, a lower value for a given preservation parameter may cause a corresponding attribute in base pose 210 to exert less influence on the new pose 218 and maintain constraints 212 in corresponding joints within the new pose 218.

To generate pose 218, machine learning model 208 converts base pose 210, constraints 212, and control parameters 214 into a set of joint vectors 216. Machine learning model 208 uses a set of neural network blocks and/or other components to convert joint vectors 216 into multiple sets of joint states 226 for joints in the virtual character. Machine learning model 208 then converts a final set of joint states 226 into positions and orientations of the joints within the new pose 218. The operation of machine learning model 208 is described in further detail below with respect to FIG. 3.

Figure 3:
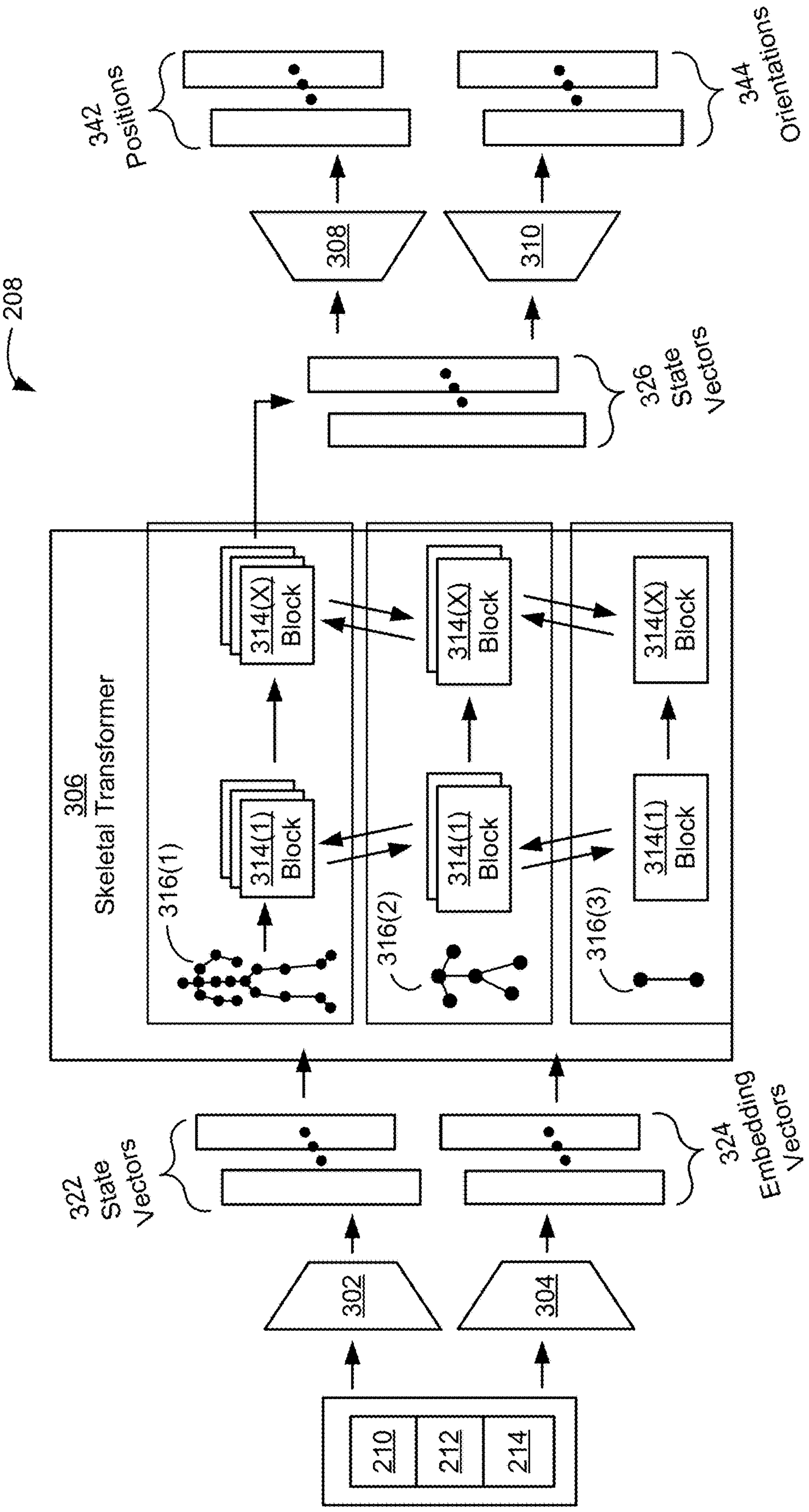
FIG. 3 illustrates an example architecture for the machine learning model of FIG. 2, according to various embodiments.

FIG. 3 illustrates an example architecture for machine learning model 208 of FIG. 2, according to various embodiments. As shown in FIG. 3, machine learning model 208 includes a set of encoders 302 and 304, a skeletal transformer 306, and a set of decoders 308 and 310. Each of these components is described in further detail below.

Input into encoders 302 and 304 includes base pose 210, constraints 212, and/or control parameters 214. For example, base pose 210 may be represented by a $N_j \times (3+6)$ matrix, where each row of the matrix corresponds to one of $N_j$ joints in a virtual character, the position of each joint is specified in three dimensions, and the orientation of each joint is specified in six dimensions. Constraints 212 may include positional constraints 212 that specify positions of certain joints, orientation constraints 212 that specify orientations of certain joints with respect to other joints, and/or look-at constraints 212 that specify orientations of certain joints with respect to an external target. Positional constraints 212 may be represented by a $N_p \times 3$ matrix and a $N_p \times 1$ vector, where each row of the matrix and each element of the vector corresponds to one of $N_p$ joints with positional constraints 212, each row of the matrix specifies a position in three dimensions, and each element of the vector specifies a joint identifier for the joint to which the position applies. Orientation constraints 212 may be represented by a $N_r \times 6$ matrix and a $N_r \times 1$ vector, where each row of the matrix and each element of the vector corresponds to one of $N_r$ joints with orientation constraints 212, each row of the matrix specifies an orientation in six dimensions, and each element of the vector specifies a joint identifier for the joint to which the orientation applies. Look-at constraints 212 may be represented by a $N_{la} \times 6$ matrix and a $N_{la} \times 1$ vector, where each row of the matrix and each element of the vector corresponds to one of $N_{la}$ joints with look-at constraints 212, each row of the matrix specifies a look-at orientation in six dimensions, and each element of the vector specifies a joint identifier for the joint to which the look-at orientation applies.

Given this input, encoders 302 and 304 generate a set of state vectors 322 and a set of embedding vectors 324 included in joint vectors 216. More specifically, encoder 302 generates a set of state vectors 322 that represent positions, orientations, and/or other attributes of joints in the virtual character based on base pose 210 and constraints 212. For example, encoder 302 may include a fully connected neural network with one hidden layer and/or another type of machine learning architecture. Encoder 302 may generate, from attributes of the ith joint as specified in base pose 210 and/or constraints 212, a state vector $$J^i_{state}$$

that encodes the position and orientation of the joint.

Encoder 304 generates a set of embedding vectors 324 that represent identities, constraints 212, and/or control parameters 214 associated with joints in the virtual character. For example, encoder 302 may include a fully connected neural network with one hidden layer and/or another type of machine learning architecture that generates an embedding vector $$J^i_{emb}$$

for the ith joint in the virtual character. Encoder 302 may initially generate an intermediate embedding $\widetilde{J^i_{emb}}$ of a one-hot encoded joint identifier for the joint:

$$\widetilde{J^i_{emb}} = W_{emb} J^i_{one-hot} \tag{1}$$

In the above equation, i is a numeric joint identifier for a corresponding joint (e.g., hip, head, right wrist, etc.), and $W_{emb}$ is a learned linear transformation.

Continuing with the above example, additional values related to constraints 212 and control parameters 214 may be added to each intermediate embedding to generate a corresponding embedding vector. These additional values may include $$c^i_{FK},$$

which is a real value in the range of [0,1] that corresponds to the orientation preservation parameter; and $$c^i_{IK},$$

which is a real value in the range of [0,1] that corresponds to the pose preservation parameter; and $$c^i_{IC},$$

which is a binary value that is set to 1 if the joint has a position, orientational, and/or look-at constraint and to 0 otherwise.

More specifically, the set of embedding vectors 324 $J_{emb}$ may be generated by appending additional values related to constraints 212 and control parameters 214 to the set of intermediate vectors $\widetilde{J_{emb}}$:

$$J_{emb} = \widetilde{J_{emb}} \oplus C_{FK} \oplus C_{IK} \oplus C_{IC} \tag{2}$$

In the above equation, $\oplus$ is the concatenation operation, and $$C_* = [c^i_*]_i.$$

Next, skeletal transformer 306 uses state vectors 322 and embedding vectors 324 to iteratively update joint states 226 for the joints. As shown in FIG. 3, skeletal transformer 306 uses a series of blocks 314(1)-314(X) (each of which is referred to individually herein as block 314) to exchange information among neighboring joints in the virtual character. Blocks 314(1)-314(X) are additionally used to process information associated with three different graphs 316(1), 316(2), and 316(3) (each of which is referred to individually herein as graph 316). Each graph 316 represents a different resolution associated with the skeletal structure of the virtual character. For example, graph 316(1) may represent a joint-level skeleton with one node per joint. Graph 316(2) may represent a limb-level skeleton that pools joints from graph 316(1) into nodes for the hip, spine, and each of the four limbs. Graph 316(3) may represent a body-level skeleton that further reduces nodes from graph 316(2) into one node each for the upper and lower body.

In one or more embodiments, skeletal transformer 306 includes a graph transformer neural network that uses attention mechanisms in blocks 314 and a number of message passing steps to exchange information among neighboring joints in each graph 316. Within blocks 314, embedding vectors 324 are used as keys K and queries Q, and state vectors 322 are used as values V. Attention scores outputted by blocks 314 are additionally assigned based on control parameters 214 in embedding vectors 324. The output of skeletal transformer 306 includes a set of state vectors 326 representing final joint states 226 of the joints in the virtual character.

Figure 4:
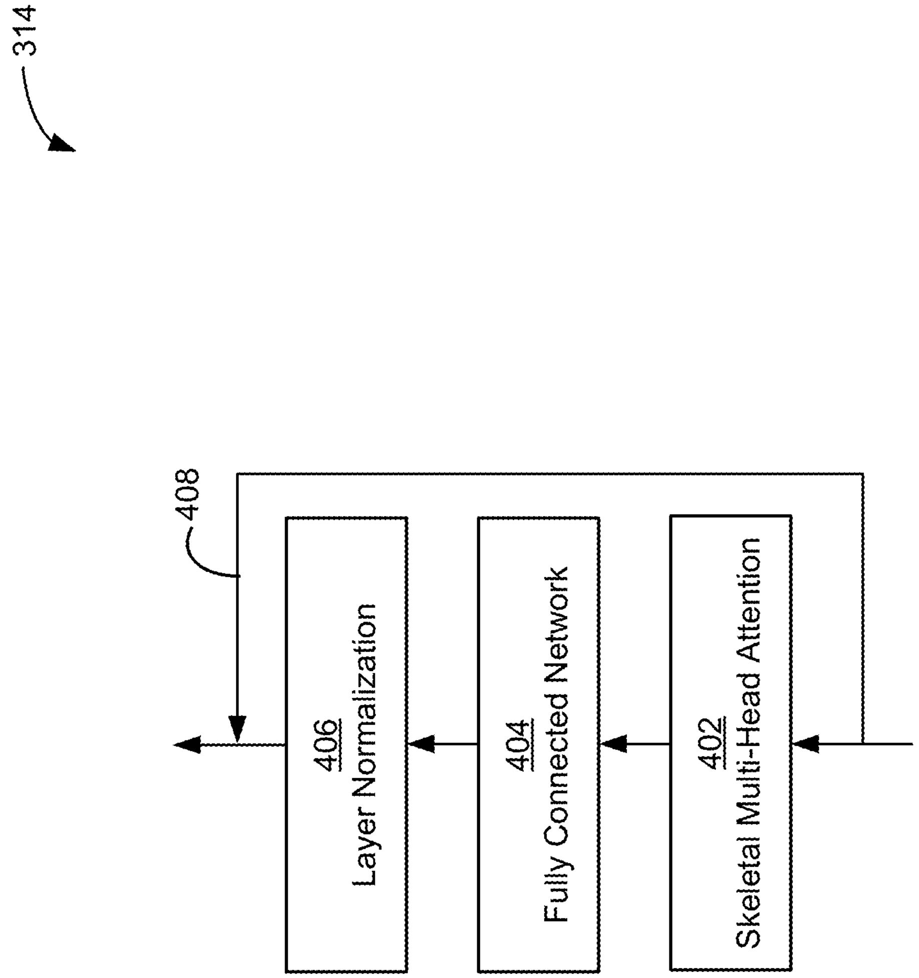
FIG. 4 is a more detailed illustration of a block in the skeletal transformer of FIG. 3, according to various embodiments.

FIG. 4 is a more detailed illustration of block 314 in skeletal transformer 306 of FIG. 3, according to various embodiments. As shown in FIG. 4, block 314 includes a skeletal multi-head attention 402 layer that splits matrices for the queries, keys, and values into multiple sub-matrices. Each sub-matrix of a given matrix is passed through a different attention head to compute an attention score, and multiple attention scores produced by the attention heads in skeletal multi-head attention 402 are combined into a single attention score. The output of skeletal multi-head attention 402 for a given joint is then calculated as a sum of values for neighboring joints in a given graph 316 that are weighted by the corresponding attention scores.

Block 314 also includes a fully connected network 404 and a layer normalization 406 that further process the output of skeletal multi-head attention 402 for a given joint. Block 314 further includes a residual link 408 that adds the input into block 314 to the output of layer normalization 406 to produce an updated joint state for the joint.

In some embodiments, the operation of block 314 is represented by the following:

$$\widetilde{J^t_{state}} = MHA(K = J_{emb}, V = J^{t-1}_{state}, Q = J_{emb}) \tag{3}$$

$$J^t_{state} = \overline{C_{IC}} \otimes \text{Layer-Norm}(FCN(\widetilde{J^t_{state}})) + J^{t-1}_{state} \tag{4}$$

In the above equations, $$J^i_{state}$$

represents the set of joint states 226 at the tth message passing step, MHA denotes skeletal multi-head attention 402, and $\widetilde{J^t_{state}}$ denotes the output of multi-head attention 402. Additionally, FCN denotes fully connected network 404, Layer-Norm represents layer normalization 406, $\overline{C_{IC}}$ is the inverse of $C_{IC}$, and $\otimes$ is the Hadamard product.

Returning to the discussion of FIG. 3, skeletal transformer 306 uses multiple layers of graphs 316 representing different resolutions associated with the skeletal structure of the virtual character to facilitate the propagation of information across the joints of the virtual character. In particular, skeletal transformer 306 uses a first block 314(1) to perform a first set of message passing steps that exchange information among nodes in graph 316(1). After the first set of message passing steps is complete, skeletal transformer 306 uses the output of the first set of message passing steps and the same block 314(1) to perform a second set of message passing steps that exchange information among nodes in graph 316(2). After the second set of message passing steps is complete, skeletal transformer 306 uses the output of the second set of message passing steps and the same block 314(1) to perform a third set of message passing steps that exchange information among nodes in graph 316(3). Skeletal transformer 306 additionally uses the output of the third set of message passing steps and block 314(1) to perform a fourth set of message passing steps that exchange information among nodes in graph 316(2). Skeletal transformer 306 then uses the output of the fourth set of message passing steps and block 314(1) to perform a fifth set of message passing steps that exchange information among nodes in graph 316(1). Skeletal transformer 306 then repeats the process with additional blocks 314 until state vectors 326 representing final joint states are outputted by block 314(X).

In some embodiments, blocks 314 and graphs 316 reduce the number of message passing steps performed to converge on a given pose 218. For example, skeletal transformer 306 may perform six message passing steps to exchange information among nodes in graph 316(1), four message passing steps to exchange information among nodes in graph 316(2), and two message passing steps to exchange information among nodes in graph 316(3) instead of a much larger number of message passing steps to exchange information among nodes in a single high-resolution graph (e.g., graph 316(1)).

Skeletal transformer 306 may additionally use various pooling and/or un-pooling functions to mix information between graphs 316 associated with different resolutions. For example, skeletal transformer 306 may use masked inter-level Multi-Head Attention blocks 314 to propagate joint states 226 associated with nodes from a given graph 316 to nodes in a different graph 316. The mask associated with these blocks 314 may be designed so that a given node can attend only to itself and corresponding nodes from a different resolution (e.g., one or more nodes in a lower resolution with which the given node is associated, a set of nodes in a higher resolution that are pooled into the given node, etc.). These blocks 314 additionally allow skeletal transformer 306 to dynamically assign weights to information from nodes in different layers.

At the beginning of the message passing process, only constrained joints hold information that should be propagated throughout the skeletal structure, as information related to the base pose is already present in the corresponding joint vectors 216. Consequently, skeletal transformer 306 can operate using a node-level mask $$M_t^l$$

that indicates which nodes hold new information in layer l after block t. At the start of the message passing process, $$M_{t=0}^{joint}$$

is the same as $C_{IC}$, and the limb-level and body-level masks are defined using the following:

$$M_{t=0}^l[j] = \begin{cases} 1 & \text{if } \exists \text{ Joint } j_0, \text{ s.t. } j_0 \in j \text{ and } c_{IC}^{j_0} = 1 \\ 0 & \text{Otherwise} \end{cases} \quad (5)$$

In other words, a given node in a lower-resolution graph 316 is determined to hold information that should be propagated if the given node is associated with another node in a higher-resolution graph 316 that holds new information.

At the end of every block 314, the mask for layer l∈{joint, limb, body} is updated using the following:

$$M_t^l = A^l M_{t-1}^l \quad (6)$$

In the above equation, $A^l$ is the adjacency matrix for nodes in graph 316 of layer l. Each entry in the mask includes an upper bound of 1 that represents full neighbor influence and prevents message passing from increasing for nodes with degree greater than 1.

State vectors 326 outputted by skeletal transformer 306 are processed by a set of decoders 308 and 310. More specifically, decoder 308 converts state vectors 326 into positions 342 of the corresponding joints in pose 218, and decoder 310 converts state vectors 326 into orientations 344 of the corresponding joints in pose 218. Like encoders 302 and 304, decoders 308 and 310 may include fully connected networks with one hidden layer and/or other machine learning architectures.

Returning to the discussion of FIG. 2, training engine 122 trains machine learning model 208 using training data 204 that includes a set of training base poses 244 and a set of training constraints 246. Training base poses 244 include various poses associated with the virtual character. For example, training base poses 244 may include poses that are generated using a motion capture technique. These poses may depict a person, animal, robot, and/or another type of articulated object walking, jogging, running, turning, spinning, dancing, strafing, waving, climbing, descending, crouching, hopping, jumping, dodging, skipping, interacting with an object, lying down, sitting, stretching, and/or engaging in another type of action, a combination of actions, and/or a sequence of actions. These poses may be retargeted to a skeleton for the virtual character that includes a certain set of joints. Training base poses 244 may also, or instead, include poses that are generated and/or edited by artists, animators, and/or other users. Training base poses 244 may also, or instead, be generated synthetically using computer vision, computer graphics, animation, machine learning, and/or other techniques.

As with constraints 212 associated with a given base pose 210, training constraints 246 include modifications to and/or deviations from training base poses 244. For example, training constraints 246 may include changes to positions, orientations, look-at constraints, and/or other types of attributes of joints in training base poses 244. Training constraints 246 may be user-specified, randomly generated (e.g., as deviations from one or more attributes in training base poses 244 that are sampled from one or more corresponding distributions), and/or otherwise determined. Training constraints 246 may also, or instead, be randomly matched to training base poses 244, defined for specific base poses 244, and/or otherwise paired with training base poses 244.

To generate a training sample in training data 204, training engine 122 may apply a given set of training constraints 246 to a corresponding training base pose. For example, training engine 122 may overwrite positions, orientations, and/or other attributes of one or more joints in a given training base pose with corresponding positions, orientations, and/or other attributes specified in a set of training constraints 246 paired with the training base pose.

A data-generation component 202 in training engine 122 determines training control parameters 248 associated with a given training sample (e.g., a training base pose and a corresponding set of training constraints 246). For example, data-generation component 202 may sample values of a set of orientation preservation parameters and a set of pose preservation parameters from uniform distributions of ranges of values for the parameters.

Data-generation component 202 also generates a set of training joint vectors 250 from a training sample that includes a set of training control parameters 248, a set of training constraints 246, and a training base pose. For example, data-generation component 202 may use the techniques described above with respect to FIG. 3 to convert the set of training control parameters 248, set of training constraints 246, and training base pose into training joint vectors 250 that include per-joint state vectors 322 and embedding vectors 324.

An update component 206 in training engine 122 trains machine learning model 208 using training joint vectors 250 generated by data-generation component 202 from the corresponding training control parameters 248, training base poses 244, and training constraints 246. More specifically, update component 206 inputs each set of training joint vectors 250 into machine learning model 208. Update component 206 also executes machine learning model 208 to produce corresponding training output 222 that represents a predicted pose for the virtual character. Update component 206 computes one or more losses 224 using training output 222 and training control parameters 248, training base pose, and training constraints 246 used to generate that set of training joint vectors 250. Update component 206 then uses a training technique (e.g., gradient descent and backpropagation) to update model parameters 220 of machine learning model 208 in a way that reduces losses 224. Update component 206 repeats the process with additional training joint vectors 250 and training output 222 until model parameters 220 converge, losses 224 fall below a threshold, and/or another condition indicating that training of machine learning model 208 is complete is met.

In some embodiments, losses 224 include a pose preservation loss that is computed between a given training base pose and a corresponding set of training output 222 generated by machine learning model 208 from that training base pose. For example, the pose preservation loss may include the following representation:

$$\mathcal{L}_{pp}(y, y', R, R') = \left\|C_{FK} \otimes \overline{M_{t=0}^{joint}} \otimes (y - y')\right\|_2^2 + \arccos\left[\left(tr\left(C_{IK} \otimes \overline{M_{t=0}^{joint}} \otimes R'^T R\right) - 1\right)/2\right] \quad (7)$$

In the above equation, $\mathcal{L}_{pp}$ denotes the pose preservation loss, y and R denote joint positions and orientations in the training base pose, respectively, and y' and R' denote joint positions and orientations in training output 222, respectively. The pose preservation loss is computed by summing a first term that corresponds to an $\mathcal{L}^2$ loss between y and y' and a second term that corresponds to an orientation geodesic loss between R and R'. The term $$\overline{M_{t=0}^{joint}}$$

corresponds to the inverse of the binary mask introduced in Equation 5 and is used to avoid penalizing joints associated with training constraints 246. The orientation preservation parameters $C_{FK}$ and pose preservation parameters $C_{IK}$ are used to weight the pose preservation loss according to the amount of the training base pose to be preserved in training output 222.

In one or more embodiments, the pose preservation loss is combined with additional losses into an overall loss $\mathcal{L}$:

$$\mathcal{L} = \mathcal{L}_{pos} + \mathcal{L}_{orient} + \mathcal{L}_{look\text{-}at} + \lambda_{pp}\mathcal{L}_{pp} \quad (8)$$

In the above equation, $\mathcal{L}_{pos}$ $$= \|\hat{y} - y'\|_2^2$$

corresponds to an $\mathcal{L}^2$ loss computed between joint positions y' in training output 222 and joint positions ŷ for the same joints as specified in training constraints 246, and $\mathcal{L}_{orient}$ =arc cos[(tr($R'^T\hat{R}$)−1)/2] corresponds to a geodesic loss that is computed between joint orientations R' in training output 222 and joint orientations R̂ for the same joints as specified in training constraints 246. $\mathcal{L}_{look\text{-}at}$ =arc cos[ $\overrightarrow{(\mathbf{t} - \hat{\mathbf{g}}_j)}$ .

$$\hat{G}_j^{13} d_j]$$

corresponds to a look-at loss geodesic loss that is computed using a unit-length vector $\overrightarrow{(\mathbf{t} - \hat{\mathbf{g}}_j)}$ pointing at the external target in world space, a direction vector $d_j$ for a joint, a predicted global transform matrix $\hat{G}_j$, and a global predicted look-at direction represented by $$\hat{G}_j^{13} d_j, \text{ where } \hat{G}_j^{13} = \hat{G}_j[1{:}3, 1{:}3].$$

After training of machine learning model 208 is complete, execution engine 124 uses the trained machine learning model 208 to generate new poses for the virtual character, where each new pose 218 is derived from a corresponding base pose 210, set of constraints 212, and set of control parameters 214. For example, execution engine 124 may use a set of encoders in machine learning model 208 to convert a given base pose 210, set of constraints 212, and set of control parameters 214 into a corresponding set of joint vectors 216. Execution engine 124 may use a graph neural network and/or attention mechanisms in machine learning model 208 to iteratively update a set of joint states 226 for joints in the virtual character based on joint vectors 216 and a hierarchy of resolutions associated with a skeletal structure for the virtual character. Execution engine 124 may then use a set of decoders in machine learning model 208 to convert a final set of joint states 226 into a corresponding new pose 218. As discussed above, pose 218 may preserve and/or combine attributes of joints from base pose 210 and constraints 212 based on control parameters 214 that represent the level of influence base pose 210 and/or constraints 212 should have on those attributes.

After a new pose 218 is generated by machine learning model 208, execution engine 124 uses forward kinematics 230 to convert pose 218 into a final output pose 232 that enforces predefined bone lengths for the virtual character. For example, execution engine 124 may apply forward kinematics 230 to pose 218 as a sequence of rigid transformations that use per-joint offset vectors to update the positions and/or orientations of joints in pose 218 based on positions and orientations of the joints in a resting pose for the virtual character. Each offset vector may represent a bone length constraint for the corresponding joint and specify a displacement of the joint with respect to a parent joint when the rotation of the joint is zero.

After output pose 232 is generated, execution engine 124 may generate a representation of the virtual character in output pose 232. For example, execution engine 124 may output a skeleton, rendering, and/or another visual representation of the virtual character in output pose 232. Execution engine 124 may also, or instead, incorporate output pose 232 into one or more frames of an animation of the virtual character.

In one or more embodiments, values of base pose 210, constraints 212, and control parameters 214 are iteratively updated within a workflow for posing and/or animating the virtual character. For example, an artist, animator, and/or another user may import, into the workflow, a "default" pose, manually generated pose, motion capture data, and/or another previously defined pose as an initial base pose 210 for the virtual character. The user may also use control handles and/or other user-interface elements to specify constraints 212 on the positions, orientations, and/or other attributes of one or more joints in the virtual character. The user may further specify control parameters 214 that indicate that joint positions and/or orientations in base pose 210 should not be preserved (e.g., due to a lack of relationship between base pose 210 and a target pose to be attained). The user may then trigger the execution of machine learning model 208 within the workflow to generate a corresponding output pose 232 that quickly incorporates changes represented by constraints 212. The user may repeat the process with the generated output pose 232 as a new base pose 210 for the virtual character and updated constraints 212 that represent changes to be made to the new base pose 210. As the generated output pose 232 is iteratively refined, the user may update control parameters 214 and/or remove constraints 212 to reduce the deviation of each output pose 232 from a corresponding base pose 210. The user may additionally associate a given output pose 232 with a frame of an animation that includes the virtual character and use that output pose 232 as a starting base pose 210 for the next frame of the animation.

In one or more embodiments, poses outputted by machine learning model 208 are used to generate animations, virtual characters, and/or other content in an immersive environment, such as (but not limited to) a VR, AR, and/or MR environment. This content can depict virtual worlds that can be experienced by any number of users synchronously and persistently, while providing continuity of data such as (but not limited to) personal identity, user history, entitlements, possession, and/or payments. It is noted that this content can include a hybrid of traditional audiovisual content and fully immersive VR, AR, and/or MR experiences, such as interactive video.

Figure 5:
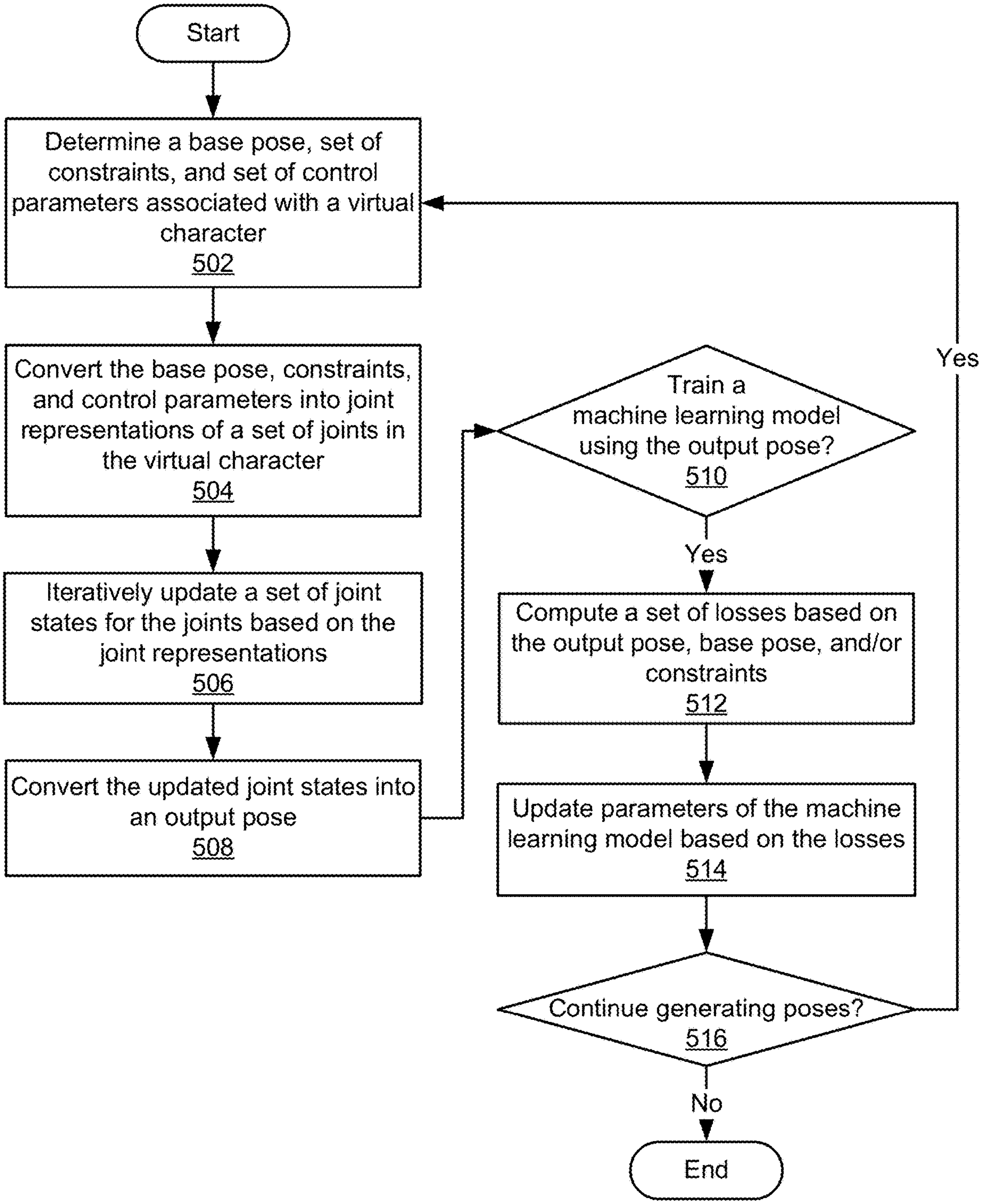
FIG. 5 is a flow diagram of method steps for generating a pose for a virtual character, according to various embodiments.

FIG. 5 is a flow diagram of method steps for generating a pose for a virtual character, according to various embodiments. Although the method steps are described in conjunction with the systems of FIGS. 1-2, persons skilled in the art will understand that any system configured to perform the method steps in any order falls within the scope of the present disclosure.

As shown, in step 502, training engine 122 and/or execution engine 124 determine a base pose, set of constraints, and set of control parameters associated with a virtual character. For example, training engine 122 and/or execution engine 124 may receive the base pose as a predefined pose for the virtual character. Training engine 122 and/or execution engine 124 may also obtain constraints related to the positions, orientations, and/or look-ats of one or more joints in the virtual character. Training engine 122 and/or execution engine 124 may additionally select and/or receive the control parameters as values that indicate the extent to which the position and/or orientation of each joint in base pose should be preserved.

In step 504, training engine 122 and/or execution engine 124 convert the base pose, constraints, and control parameters into joint representations of a set of joints in the virtual character. For example, training engine 122 and/or execution engine 124 may use one or more encoder neural networks generate, for each joint in the virtual character, a joint embedding that encodes a joint identifier for the joint, control parameters associated with the joint, and a binary value indicating whether or not the joint is constrained. Training engine 122 and/or execution engine 124 may also use the encoder neural network(s) to generate, for each joint in the virtual character, an initial joint state that encodes the position, orientation, and/or other attributes of the joint from the base pose and/or constraints.

In step 506, training engine 122 and/or execution engine 124 iteratively update a set of joint states for the joints based on the joint representations. For example, training engine 122 and/or execution engine 124 may use a graph transformer neural network to perform message passing among the joints and/or between the joints and one or more lower-resolution representations of the skeletal structure of the virtual character. Each message passing step may involve using a block in the graph transformer neural network to update the joint states based on attention scores and/or joint states from a previous message passing step.

In step 508, training engine 122 and/or execution engine 124 convert the updated joint states into an output pose. Continuing with the above example, training engine 122 and/or execution engine 124 may use one or more decoder neural networks to decode final joint states outputted by the graph transformer neural network into positions and orientations of the joints. Training engine 122 and/or execution engine 124 may additionally perform a forward kinematics step that updates the positions and/or orientations of the joints in a way that enforces bone lengths in the virtual character.

In step 510, training engine 122 and/or execution engine 124 determine whether or not to train a machine learning model using the output pose. For example, training engine 122 and/or execution engine 124 may determine that the encoder, graph transformer, and/or decoder neural networks are to be trained using the output pose if the output pose is generated during a training process associated with the encoder, graph transformer, and/or decoder neural networks; the output pose is flagged as unnatural, unrealistic, and/or otherwise suboptimal by a user, and/or another condition associated with training of the encoder, graph transformer, and/or decoder neural networks is met.

If training engine 122 and/or execution engine 124 determine that the machine learning model is to be trained using the output pose, training engine 122 performs step 512, in which training engine 122 computes a set of losses based on the output pose, base pose, and/or constraints. These losses may include a pose preservation loss associated with preservation of the base pose in the output pose. These losses may also, or instead, be used to preserve one or more constraints in the output pose.

In step 514, training engine 122 updates parameters of the machine learning model based on the losses. For example, training engine 122 could use a training technique (e.g., gradient descent and backpropagation) to update neural network weights of the encoder, graph transformer, and/or decoder neural networks in a way that reduces the loss(es).

If training engine 122 and/or execution engine 124 determine in step 510 that the output pose should not be used to train the machine learning model, training engine 122 and/or execution engine 124 skip steps 512 and 514 and proceed to step 516 from step 510.

In step 516, training engine 122 and/or execution engine 124 determine whether or not to continue generating poses. For example, training engine 122 and/or execution engine 124 may determine that poses should continue to be generated during training of the machine learning model, during execution of a workflow for posing and/or animating the virtual character, and/or in another environment or setting in which poses for the virtual character are to be generated. If training engine 122 and/or execution engine 124 determine that poses should continue to be generated for the virtual character, training engine 122 and/or execution engine 124 repeat steps 502, 504, 506, 508, 510, 512, and/or 514 to continue generating new output poses for the virtual character and/or training the virtual character using the new output poses. Training engine 122 and/or execution engine 124 also repeat step 516 to determine whether or not to continue generating poses. During step 516, training engine 122 and/or execution engine 124 may determine that poses should not continue to be generated once training of the machine learning model is complete, execution of the workflow for posing and/or animating the virtual character is discontinued, and/or another condition is met.

In sum, the disclosed techniques perform pose-aware neural inverse kinematics (IK) using a machine learning model that generates new poses for entities in two-dimensional (2D) and/or three-dimensional (3D) space while preserving characteristics of a base pose. The operation of the machine learning model is conditioned on both sparse constraints (e.g., positions and/or orientations of a subset of joints) and a base pose, which allows the machine learning model to generate new poses that satisfy the sparse constraints while selectively preserving various aspects of the base pose.

The machine learning model is trained using a pose preservation loss that is computed between an output pose generated by the machine learning model and a corresponding base pose. The output pose can further be adjusted via input control parameters that specify the degree to which positions, orientations, and/or other aspects of the base pose are to be preserved.

The machine learning model includes a set of encoder neural network layers that encode identities, positions, and orientations of joints in a skeletal structure for an entity. The machine learning model also includes a graph transformer neural network with a cross-layer attention mechanism that simultaneously performs message passing at multiple resolutions (e.g., joint level, limb level, body level, etc.) associated with the skeletal structure based on the encoded identities, positions, and orientations. The machine learning model further includes a set of decoder neural network layers that decode the final encodings outputted by the graph neural network into positions and orientations of the joints. A forward kinematics step is used to convert the positions and orientations outputted by the machine learning model into updated positions and orientations of the joints that are consistent with the lengths of bones in the skeletal structure.

One technical advantage of the disclosed techniques relative to the prior art is the ability to generate new poses that satisfy sparse constraints while selectively preserving certain aspects of a base pose. The disclosed techniques thus avoid issues associated with global pose changes in conventional neural IK models, where manipulating one part of a skeletal structure can result in changes to un-manipulated parts of the skeletal structure. Another technical advantage of the disclosed techniques is the preservation of previous edits in computer-based posing workflows. Consequently, the disclosed techniques allow artists and/or other users to iteratively refine poses without losing previous work, which can reduce latency and/or improve efficiency associated with the use of computer-based posing workflows to pose and/or animate virtual characters. An additional technical advantage of the disclosed techniques is the ability to learn both local and global representations of a pose via the use of a graph neural network with a cross-layer attention mechanism that performs message passing across multiple resolutions associated with the skeletal structure. As a result, output poses generated via the disclosed techniques can be more natural and realistic than poses produced using traditional IK techniques. These technical advantages provide one or more technological improvements over prior art approaches.

1. In some embodiments, a computer-implemented method for generating a pose for a virtual character comprises determining a set of joint representations corresponding to a set of joints in the virtual character based on (i) a base pose for the virtual character and (ii) a set of constraints associated with one or more joints included in the set of joints; generating, via execution of a first neural network, a set of updated joint states for the set of joints based on the set of joint representations; and generating, based on the set of updated joint states, an output pose that includes (i) a first set of joint positions for the set of joints and (ii) a first set of joint orientations for the set of joints.

2. The computer-implemented method of clause 1, further comprising training the first neural network using (i) a first loss that is computed between the first set of joint positions and a second set of joint positions included in the base pose and (ii) a second loss that is computed between the first set of joint orientations and a second set of joint orientations included in the base pose.

3. The computer-implemented method of any of clauses 1-2, further comprising training the first neural network based on one or more additional losses associated with the set of constraints.

4. The computer-implemented method of any of clauses 1-3, wherein the first loss is further computed based on a first set of control parameters associated with preservation of the second set of joint positions in the output pose and the second loss is computed based on a second set of control parameters associated with preservation of the second set of joint orientations in the output pose.

5. The computer-implemented method of any of clauses 1-4, wherein determining the set of joint representations comprises generating, via execution of a second neural network, a first set of embeddings associated with a set of identities for the set of joints; determining, based on the base pose and the set of constraints, (i) a second set of joint positions for the set of joints and (ii) a second set of joint orientations for the set of joints; and converting, via execution of a third neural network, the second set of joint positions and the second set of joint orientations into a second set of embeddings for the set of joints.

6. The computer-implemented method of any of clauses 1-5, wherein converting the set of joint representations into the set of updated joint states comprises generating the set of updated joint states based on the set of joint representations and a set of message-passing iterations.

7. The computer-implemented method of any of clauses 1-6, wherein generating the pose comprises converting, via execution of one or more additional neural networks, the set of updated joint states into the first set of joint positions and the first set of joint orientations; and updating the first set of joint positions and the first set of joint orientations based on a rest pose for the virtual character.

8. The computer-implemented method of any of clauses 1-7, wherein the set of constraints comprises at least one of a positional constraint, an orientation constraint, or a look-at constraint.

9. The computer-implemented method of any of clauses 1-8, wherein the first neural network comprises a set of cross-layer attention blocks associated with a plurality of resolutions for a skeletal structure of the virtual character.

10. The computer-implemented method of any of clauses 1-9, wherein the first neural network comprises a graph neural network.

11. In some embodiments, one or more non-transitory computer-readable media store instructions that, when executed by one or more processors, cause the one or more processors to perform operations comprising determining a set of joint representations corresponding to a set of joints in a virtual character based on (i) a base pose for the virtual character and (ii) a set of constraints associated with one or more joints included in the set of joints; generating, via execution of a first neural network, a set of updated joint states for the set of joints based on the set of joint representations; and generating, based on the set of updated joint states, an output pose that includes (i) a first set of joint positions for the set of joints and (ii) a first set of joint orientations for the set of joints.

12. The one or more non-transitory computer-readable media of clause 11, wherein the operations further comprise training the first neural network using a first loss that is computed based on the first set of joint positions, a second set of joint positions included in the base pose, and a first set of control parameters associated with preservation of the second set of joint positions in the output pose.

13. The one or more non-transitory computer-readable media of any of clauses 11-12, wherein the operations further comprise further training the first neural network using a second loss that is computed based on the first set of joint orientations, a second set of joint orientations included in the base pose, and a second set of control parameters associated with preservation of the second set of joint orientations in the output pose.

14. The one or more non-transitory computer-readable media of any of clauses 11-13, wherein determining the set of joint representations comprises generating a set of joint embeddings included in the set of joint representations based on (i) a set of identities for the set of joints, (ii) a set of control parameters associated with preservation of the base pose in the output pose, and (iii) the set of constraints; and determining, based on the base pose and the set of constraints, a set of initial joint states corresponding to (i) a second set of joint positions for the set of joints and (ii) a second set of joint orientations for the set of joints.

15. The one or more non-transitory computer-readable media of any of clauses 11-14, wherein converting the set of joint representations into the set of updated joint states comprises computing a set of attention scores based on the set of joint representations; and generating the set of updated joint states based on the set of attention scores.

16. The one or more non-transitory computer-readable media of any of clauses 11-15, wherein the set of attention scores is further computed based on a plurality of graphs corresponding to different resolutions associated with the set of joints.

17. The one or more non-transitory computer-readable media of any of clauses 11-16, wherein the set of attention scores is further computed based on a set of masks associated with the one or more joints.

18. The one or more non-transitory computer-readable media of any of clauses 11-17, wherein generating the output pose comprises converting, via execution of one or more additional neural networks, the set of updated joint states into the first set of joint positions and the first set of joint orientations; and updating the first set of joint positions and the first set of joint orientations via a forward kinematics technique.

19. The one or more non-transitory computer-readable media of any of clauses 11-18, wherein the first neural network comprises a graph transformer neural network.

20. In some embodiments, a system comprises one or more memories that store instructions, and one or more processors that are coupled to the one or more memories and, when executing the instructions, are configured to perform operations comprising determining a set of joint representations corresponding to a set of joints in a virtual character based on (i) a base pose for the virtual character and (ii) a set of constraints associated with one or more joints included in the set of joints; generating, via execution of a first neural network, a set of updated joint states for the set of joints based on the set of joint representations; and generating, based on the set of updated joint states, an output pose that includes (i) a first set of joint positions for the set of joints and (ii) a first set of joint orientations for the set of joints.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a pose for a virtual character, comprising:

determining a set of joint representations corresponding to a set of joints in the virtual character based on (i) a base pose associated with the set of joints, (ii) a set of constraints that include changes to the base pose for one or more joints included in the set of joints, and (iii) a set of control parameters;

generating, via execution of a first neural network, a set of updated joint states for the set of joints based on the set of joint representations; and generating, based on the set of updated joint states, an output pose that includes (i) a first set of joint positions for the set of joints and (ii) a first set of joint orientations for the set of joints, wherein an influence of the base pose and an additional influence of the set of constraints on the first set of joint positions and the first set of joint orientations is determined based on the set of control parameters.

2. The computer-implemented method of claim 1, further comprising training the first neural network using (i) a first loss that is computed between the first set of joint positions and a second set of joint positions included in the base pose and (ii) a second loss that is computed between the first set of joint orientations and a second set of joint orientations included in the base pose.

3. The computer-implemented method of claim 2, further comprising training the first neural network based on one or more additional losses associated with the set of constraints.

4. The computer-implemented method of claim 2, wherein the first loss is further computed based on a first subset of the set of control parameters associated with preservation of the second set of joint positions in the output pose and the second loss is computed based on a second subset of the set of control parameters associated with preservation of the second set of joint orientations in the output pose.

5. The computer-implemented method of claim 1, wherein determining the set of joint representations comprises:

generating, via execution of a second neural network, a first set of embeddings associated with a set of identities for the set of joints;

determining, based on the base pose and the set of constraints, (i) a second set of joint positions for the set of joints and (ii) a second set of joint orientations for the set of joints; and converting, via execution of a third neural network, the second set of joint positions and the second set of joint orientations into a second set of embeddings for the set of joints.

6. The computer-implemented method of claim 1, wherein converting the set of joint representations into the set of updated joint states comprises generating the set of updated joint states based on the set of joint representations and a set of message-passing iterations.

7. The computer-implemented method of claim 1, wherein generating the pose comprises:

converting, via execution of one or more additional neural networks, the set of updated joint states into the first set of joint positions and the first set of joint orientations; and updating the first set of joint positions and the first set of joint orientations based on a rest pose for the virtual character.

8. The computer-implemented method of claim 1, wherein the set of constraints comprises at least one of a positional constraint, an orientation constraint, or a look-at constraint.

9. The computer-implemented method of claim 1, wherein the first neural network comprises a set of cross-layer attention blocks associated with a plurality of resolutions for a skeletal structure of the virtual character.

10. The computer-implemented method of claim 1, wherein the first neural network comprises a graph neural network.

11. One or more non-transitory computer-readable media storing instructions that, when executed by one or more processors, cause the one or more processors to perform operations comprising:

determining a set of joint representations corresponding to a set of joints in a virtual character based on (i) a base pose associated with the set of joints, (ii) a set of constraints that include changes to the base pose for one or more joints included in the set of joints, and (iii) a set of control parameters;

generating, via execution of a first neural network, a set of updated joint states for the set of joints based on the set of joint representations; and generating, based on the set of updated joint states, an output pose that includes (i) a first set of joint positions for the set of joints and (ii) a first set of joint orientations for the set of joints, wherein an influence of the base pose and an additional influence of the set of constraints on the first set of joint positions and the first set of joint orientations is determined based on the set of control parameters.

12. The one or more non-transitory computer-readable media of claim 11, wherein the operations further comprise training the first neural network using a first loss that is computed based on the first set of joint positions, a second set of joint positions included in the base pose, and a first subset of the set of control parameters associated with preservation of the second set of joint positions in the output pose.

13. The one or more non-transitory computer-readable media of claim 12, wherein the operations further comprise further training the first neural network using a second loss that is computed based on the first set of joint orientations, a second set of joint orientations included in the base pose, and a second subset of the set of control parameters associated with preservation of the second set of joint orientations in the output pose.

14. The one or more non-transitory computer-readable media of claim 11, wherein determining the set of joint representations comprises:

generating a set of joint embeddings included in the set of joint representations based on (i) a set of identities for the set of joints, (ii) the set of control parameters, and (iii) the set of constraints; and determining, based on the base pose and the set of constraints, a set of initial joint states corresponding to (i) a second set of joint positions for the set of joints and (ii) a second set of joint orientations for the set of joints.

15. The one or more non-transitory computer-readable media of claim 11, wherein converting the set of joint representations into the set of updated joint states comprises:

computing a set of attention scores based on the set of joint representations; and generating the set of updated joint states based on the set of attention scores.

16. The one or more non-transitory computer-readable media of claim 15, wherein the set of attention scores is further computed based on a plurality of graphs corresponding to different resolutions associated with the set of joints.

17. The one or more non-transitory computer-readable media of claim 15, wherein the set of attention scores is further computed based on a set of masks associated with the one or more joints.

18. The one or more non-transitory computer-readable media of claim 11, wherein generating the output pose comprises:

converting, via execution of one or more additional neural networks, the set of updated joint states into the first set of joint positions and the first set of joint orientations; and updating the first set of joint positions and the first set of joint orientations via a forward kinematics technique.

19. The one or more non-transitory computer-readable media of claim 11, wherein the first neural network comprises a graph transformer neural network.

20. A system, comprising:

one or more memories that store instructions, and one or more processors that are coupled to the one or more memories and, when executing the instructions, are configured to perform operations comprising:

determining a set of joint representations corresponding to a set of joints in a virtual character based on (i) a base pose associated with the set of joints, (ii) a set of constraints that include changes to the base pose for one or more joints included in the set of joints, and (iii) a set of control parameters;

generating, via execution of a first neural network, a set of updated joint states for the set of joints based on the set of joint representations; and generating, based on the set of updated joint states, an output pose that includes (i) a first set of joint positions for the set of joints and (ii) a first set of joint orientations for the set of joints, wherein an influence of the base pose and an additional influence of the set of constraints on the first set of joint positions and the first set of joint orientations is determined based on the set of control parameters.

* * * * *